United States Patent [19]
Lane et al.

[11] 3,778,025
[45] Dec. 11, 1973

[54] MODIFIED ON-OFF CONTROL

[75] Inventors: Donald W. Lane, Boothwyn, Pa.; Troy J. Pemberton, Bartlesville, Okla.

[73] Assignee: Phillips Petroleum Company, Bartlesville, Okla.

[22] Filed: Mar. 29, 1972

[21] Appl. No.: 239,052

Related U.S. Application Data

[62] Division of Ser. No. 48,343, June 22, 1970, Pat. No. 3,676,782.

[52] U.S. Cl. .................. 251/129, 318/610, 236/18, 236/78 D
[51] Int. Cl. .. F16k 31/06, G05b 11/10, G05b 11/38
[58] Field of Search .................... 137/487.5, 101.19, 137/101.21, 93; 251/129; 91/429, 430; 318/610, 621, 635

[56] References Cited
UNITED STATES PATENTS

| 2,734,703 | 2/1956 | Markusen | 318/621 X |
| 3,510,737 | 5/1970 | Brown et al. | 318/635 X |
| 3,521,535 | 7/1970 | Oelrich | 91/47 |
| 3,256,902 | 6/1966 | Porter | 137/93 |

*Primary Examiner*—Arnold Rosenthal
*Attorney*—Quigg & Oberlin

[57] ABSTRACT

A modified on-off controller is formed by adding an alternating signal to the error signal. The frequency of the added signal is sufficiently high to prevent the control element from responding at this frequency. A derivative signal can also be added.

5 Claims, 2 Drawing Figures

MODIFIED ON-OFF CONTROL

This application is a division of copending application Ser. No. 48,343, filed June 22, 1970, now U.S. Pat. No. 3,676,782.

In the process control field there are two basic types of control systems. One is commonly referred to as "on-off" control and the other as "proportional" control. On-off control, as the name implies, refers to a system in which the control element is in one of two positions, depending on the magnitude of the measured variable. For example, a control valve can be either open or closed. In a proportional control system the position of the control element is adjusted in response to the magnitude of the measured variable. For example, the degree of opening of a valve can be adjusted in response to the measured variable. On-off control systems are usually less expensive to install than proportional control systems and are quite effective in certain types of operations. Proportional control systems, on the other hand, usually have greater versatility and can incorporate such features as integral and derivative control modes.

In accordance with this invention, an improved control system is provided which employs certain desirable characteristics of both on-off and proportional control systems. This system basically provides on-off control, except that the action approximates proportional control when the measured variable does not differ appreciably from the set point value. In the control system of this invention, the output signal from an oscillator is combined with the controller error signal to provide an output signal. The frequency of the oscillator is sufficiently high that the controlled element is unable to respond to variations of the oscillator signal. However, this element serves as a low-pass filter so that effective proportional control is provided over certain operating ranges. This control system of this invention can also incorporate a derivative form of control which is desirable in certain operations.

In the accompanying drawing.

Figures 1, 2:
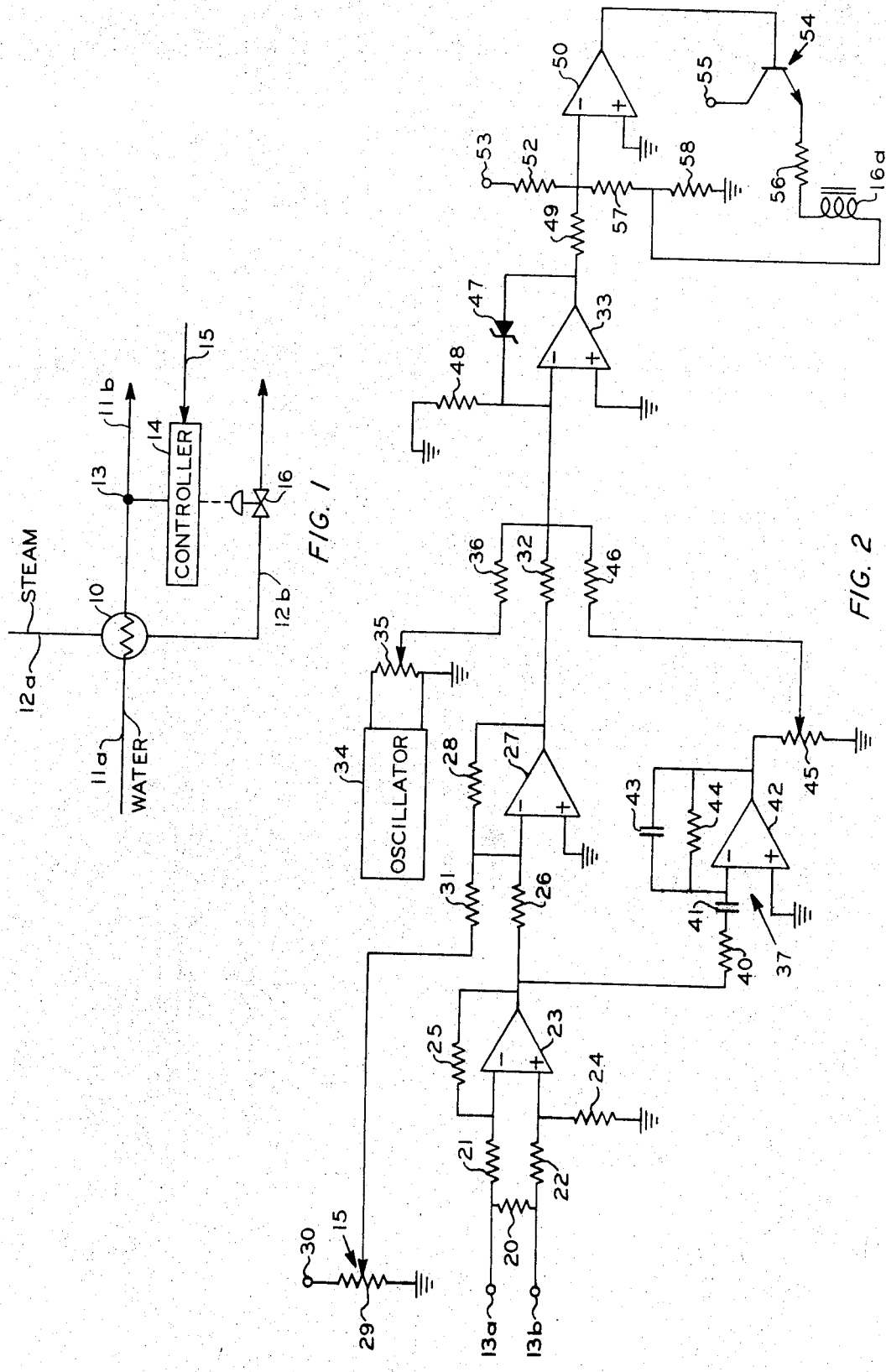
FIG. 1 is a schematic representation of a heat exchange system having the controller of this invention incorporated therein.
FIG. 2 is a schematic circuit drawing of an embodiment of the controller of this invention.

Referring now to the drawing in detail and to FIG. 1 in particular, there is shown a conventional heat exchanger 10. A stream of water to be heated is introduced through a conduit 11a, and the heated water is removed through a conduit 11b. Heat is supplied by the condensation of steam in heat exchanger 10. To this end, steam is introduced through a conduit 12a, and the condensate is removed through a conduit 12b. A temperature sensing element 13 is associated with conduit 11b to measure the temperature of the heated water and provide a signal representative thereof. This signal is applied to the input of a controller 14 which receives a set point signal 15 that is representative of the desired temperature of the heated water. An output signal from controller 14 adjusts a valve 16 in conduit 12b to control the rate of condensate withdrawal and thereby the temperature of the heated water.

Controller 14 is illustrated in detail in FIG. 2. Temperature sensing element 13 of FIG. 1 provides an output electrical signal, the amplitude of which is representative of the measured temperature. This signal is applied between input terminals 13a and 13b of FIG. 2. A resistor 20 is connected between terminals 13a and 13b. Resistors 21 and 22 are connected between terminals 13a and 13b, respectively, and the first and second inputs of an amplifier 23. A resistor 24 is connected between the second input terminal of amplifier 23 and ground. A feedback resistor 25 is connected between the output and the first input terminal of amplifier 23. The output of amplifier 23 is connected by an input resistor 26 to the first input terminal of an amplifier 27, the second input terminal of which is connected to ground. The signal applied to amplifier 27 through resistor 26 is representative of the measured temperature of the water flowing through conduit 11b.

Set point signal 15 is established by a potentiometer 29 which is connected between a reference potential terminal 30 and ground. The contactor of potentiometer 29 is connected to the first input terminal of amplifier 27 by an input resistor 31. Amplifier 27 is provided with a feedback resistor 28. Amplifier 27 thus functions as a summing amplifier to compare the measured temperature with the set point value. The polarities of the signals being compared are adjusted so that the output signal from amplifier 27 is representative of any difference between the desired set point signal and the signal representative of the actual measured temperature. This output signal is applied through a resistor 32 to the first input terminal of a summing amplifier 33.

The output terminals of an oscillator 34 are connected across a potentiometer 35. The contactor of potentiometer 35 is connected by a resistor 36 to the first input terminal of amplifier 33. Thus, an alternating current signal is combined with the error signal from amplifier 27.

A third signal is applied to the input of amplifier 33 from a derivative network 37. The output of amplifier 23 is connected by a resistor 40 and a capacitor 41 to the first input terminal of an amplifier 42. The second input terminal of amplifier 42 is connected to ground. A capacitor 43 and a resistor 44 are connected in parallel with one another between the output and the first input terminal of amplifier 42. Amplifier 42 and its associated circuit elements thus provide a derivative network. A potentiometer 45 is connected between the output of amplifier 42 and ground. The contactor of potentiometer 45 is connected by a resistor 46 to the first input terminal of amplifier 33.

A Zener diode 47 is connected between the output of amplifier 33 and the first input terminal. A resistor 48 is connected between this first input terminal and ground. Amplifier 33 functions as an on-off device so that the output signal is at one of two potential levels, depending on the amplitude of the input signal to the amplifier.

The output of amplifier 33 is connected by a resistor 49 to the first input terminal of an amplifier 50, and second input terminal of which is connected to ground. The first input terminal of amplifier 50 is connected by a resistor 52 to a terminal 53 which is maintained at a reference potential to provide a bias signal to the amplifier. The output of amplifier 50 is connected to the base of a transistor 54. The collector of the transistor is connected to a terminal 55 which is maintained at a positive potential. The emitter of transistor 54 is connected by a resistor 56 to the first terminal of a coil 16a which can represent a solenoid employed to actuate valve 16, for example. The second terminal of coil 16a is connected to the junction between resistors 57 and 58. The second terminal of resistor 57 is connected to the first input terminal of amplifier 50. The second terminal of resistor 58 is connected to ground. Amplifier 50 and transistor 54 serve to convert the output signal from amplifier 33 into a current signal of sufficient magnitude to actuate valve 16. Coil 16a serves to filter the output current signal.

The frequency of oscillator 34 is selected to be sufficiently high that valve 16 is not capable of operating at the oscillator frequency. If the measured temperature is equal to the set point value 15, the only signal applied to the input of amplifier 33 is the output signal from oscillator 34. This signal does not affect the position of valve 16. If the measured temperature signal differs from the set point signal, a DC signal is applied to the input of amplifier 33 through resistor 32. The amplitude of this signal may be sufficient to cause valve 16 to be actuated. When the measured signal changes, a signal is applied through derivative network 37 to the input of amplifier 33. The filtering action provided by coil 16a and the inertia of the associated mechanical components of the valve permit the controller to operate essentially as a proportional controller if the measured temperature signal approximates the set point value. If the measured signal differs appreciably from the set point value, the control action is essentially on-off. While a solenoid valve has been illustrated, coil 16a can represent a conventional control element, such as a pneumatic controller which establishes an output pneumatic signal to regulate a valve.

The particular wave form of the signal from oscillator 34 can differ for specific applications of this invention. In some operations, a sinusoidal or modified sinusoidal signal gives a desirable control, while in other operations a triangular signal may be preferred. In any event the frequency of oscillator 33 should be sufficiently high that the control element does not respond at this frequency. A frequency in the range of 100 to 1,000 cycles per second is usually satisfactory. Derivative network 37 is not required in all operations, but is generally desirable because it provides a smoother control. It appears that the controller of this invention is primarily useful in applications which do not have appreciable dead time or which do not have significant lags higher than second order.

While this invention has been described in conjunction with presently preferred embodiments, it should be evident that it is not limited thereto.

What is claimed is:

1. Control apparatus comprising:

signal comparing means adapted to receive an input measurement signal and a set point signal and establish a first signal representative of any difference therebetween;

signal summing means adapted to receive three input signals and establish an output signal representative of the sum of the three input signals;

an oscillator adapted to provide an alternating signal;

circuit means adapted to establish an output signal which is representative of the derivative of an input signal applied thereto;

means to apply the input measurement signal to the input of said circuit means;

means to apply said first signal, said alternating signal and the output signal of said circuit means simultaneously as input signals to said signal summing means;

a control element having an input inpedance element therein;

means responsive to the output signal from said summing means to establish a current corresonding to the amplitude of said output signal; and means to pass said current through said impedance element to actuate said control element.

2. The apparatus of claim 1 wherein said control element is a solenoid actuated control valve, the solenoid thereof being said impedance element.

3. The apparatus of claim 1 wherein said control element is a pneumatic controller adapted to provide an output pneumatic pressure proportional to an input current supplied thereto.

4. The apparatus of claim 1 wherein said summing means comprises a summing amplifier having a zener diode connected in a feedback path between the output and the input of said summing amplifier.

5. The apparatus of claim 1 wherein the frequency of said alternating signal is in the range of 100 to 1,000 cycles per second.

* * * * *